US012240223B2

(12) United States Patent
Ikeuchi et al.

(10) Patent No.: US 12,240,223 B2
(45) Date of Patent: Mar. 4, 2025

(54) PRINTER

(71) Applicant: SCREEN HOLDINGS CO., LTD., Kyoto (JP)

(72) Inventors: Kazutaka Ikeuchi, Kyoto (JP); Tamio Fukui, Kyoto (JP)

(73) Assignee: SCREEN HOLDINGS CO., Ltd., Kyoto (JP)

( * ) Notice: Subject to any disclaimer, the term of this patent is extended or adjusted under 35 U.S.C. 154(b) by 238 days.

(21) Appl. No.: 18/160,421

(22) Filed: Jan. 27, 2023

(65) Prior Publication Data

US 2023/0241903 A1 Aug. 3, 2023

(30) Foreign Application Priority Data

Jan. 31, 2022 (JP) ................................ 2022-012730

(51) Int. Cl.
*B41J 11/00* (2006.01)

(52) U.S. Cl.
CPC ................................ *B41J 11/0015* (2013.01)

(58) Field of Classification Search
CPC ...... B41J 2/2056; B41J 2/2114; B41J 2/2117; B41J 2/2121; B41J 29/393; B41J 11/0015; B41J 11/00214
See application file for complete search history.

(56) References Cited

U.S. PATENT DOCUMENTS 8,215,744 B2 * 7/2012 Yamanobe ........... B41M 5/0017 347/21
8,411,326 B2 4/2013 Inoue
8,777,396 B2 * 7/2014 Mizes .................. B41J 2/04508 347/103
8,807,731 B2 * 8/2014 Takeuchi ........... B41J 11/00214 347/100
9,403,383 B1 8/2016 Liu et al.
2013/0293629 A1 11/2013 Niino et al.
2018/0065381 A1 * 3/2018 Takasugi ............ B41J 11/00218

FOREIGN PATENT DOCUMENTS

EP 1 905 609 A2 4/2008
JP 2013-248883 A 12/2013

OTHER PUBLICATIONS

Extended European Search Report issued in corresponding European Patent Application No. 23153454.6-1014, dated Jun. 15, 2023.

* cited by examiner

*Primary Examiner* — Anh T Vo
(74) *Attorney, Agent, or Firm* — Rimon P.C.

(57) ABSTRACT

The technique provided enables, when first ink is precured and second ink is ejected thereon, ensuring sufficient adhesion of the second ink via a primer. A printer includes a transport mechanism, a primer ejection head, a second light irradiator, a white-ink ejection head, a color-ink ejection head, and a controller. The controller controls the amount of primer ejected to a unit region of a continuous base material by the primer ejection head, the amount of white ink ejected thereto by the white-ink ejection head, and the amount of color ink ejected thereto by the color-ink ejection head. The controller determines a first primer amount based on the amount of white ink and determines a second primer amount based on the amount of color ink. The controller then determines an ultimate primer amount based on the sum of the first primer amount and the second primer amount.

10 Claims, 7 Drawing Sheets

COLOR INK AMOUNT

PRINTER

RELATED APPLICATIONS

This application claims the benefit of Japanese Application No. 2022-012730, filed on Jan. 31, 2022, the disclosure of which is incorporated by reference herein.

BACKGROUND OF THE INVENTION

Field of the Invention

The present invention relates to a printer.

Description of the Background Art

Inkjet printers using light-cured ink (e.g., UV ink) have conventionally been known. The printers of this type eject light-cured ink from ejection heads to a base material and irradiate the ink adhering to the base material with light so as to form a layer of the cured ink on the base material.

For example, the base material may be formed of a raw material with low ink permeability, such as a resin material or a metallic material. In this case, a measure that is taken due to low fixity of the ink involves applying a primer in advance to the surface of the base material in order to improve adhesion properties of the ink and then ejecting the ink on the primer.

For example, Japanese Patent Application Laid-Open No. 2013-248883 describes ejecting ink after previous ejection of a processing liquid to a recording medium, the processing liquid containing components capable of either insolubilizing or agglomerating components contained in the ink. Japanese Patent Application Laid-Open No. 2013-248883 also describes changing the amount of the processing liquid depending on the resolution of an image. That is, in the case of recording a low-resolution image, ink is hard to be dried because ink dots to be formed on recording paper have greater diameters and the recording speed becomes higher than in the case of recording a high-resolution image. Accordingly, the above document describes increasing the amount of application of a pre-processing liquid in the case where an image to be formed has low resolution.

SUMMARY OF THE INVENTION

Technical Problem

In the case of performing printing with a plurality of types of ink, in some cases first ink may be ejected and precured in advance and then second ink may be ejected on the first ink. For example, in the case where a color image is formed on a white background, white ink may be ejected and precured in advance, and then color ink may be ejected on the precured white ink. In such printing using a primer, it is conceivable to determine the amount of the primer in proportion to the total amount of the white ink and the color ink.

However, the white ink is ejected on the previously applied primer, whereas the color ink is ejected on the white ink precured on the primer. Thus, if the amount of the primer to be applied in advance is not enough, the color ink may fail to obtain sufficient adhesion properties via the primer, and this may deteriorate print quality.

It is an object of the present invention to provide a technique that enables, when first ink is precured in advance and second ink is ejected on the precured first ink, ensuring sufficient adhesion properties of the second ink via a primer.

Solution to Problem

To solve the problem described above, a first aspect is a printer that includes a transport mechanism that transports a base material downstream in a predetermined transport path, a primer ejector that ejects a primer to the base material transported by the transport mechanism, a first ink ejector that ejects first ink to the base material on a downstream side of the primer ejector, a precuring part that precures the first ink applied to the base material on a downstream side of the first ink ejector, a second ink ejector that ejects second ink to the base material on a downstream side of the precuring part, and a controller that controls an amount of the primer that is ejected to a unit region of the base material by the primer ejector, an amount of the first ink that is ejected to the unit region by the first ink ejector, and an amount of the second ink that is ejected to the unit region by the second ink ejector. The controller is capable of executing processing for determining a first primer amount in accordance with the amount of the first ink, processing for determining a second primer amount in accordance with the amount of the second ink, and processing for determining the amount of the primer in accordance with a sum of the first primer amount and the second primer amount.

According to the printers of the first to tenth aspects, the amount of the primer is determined based on the amount of the first ink and the amount of the second ink. Thus, even if the second ink is ejected on the precured first ink, it is possible to ensure sufficient adhesion properties of the second ink via the primer.

A second aspect is the printer according to the first aspect. The printer further includes a storage that stores a first curve that defines correspondence between the amount of the first ink and the first primer amount. The controller determines the first primer amount in accordance with the first curve.

According to the printer of the second aspect, the first primer amount is determined based on the first curve.

A third aspect is the printer according to the second aspect, in which the storage stores a second curve that defines correspondence between the amount of the second ink and the second primer amount, and the controller determines the second primer amount in accordance with the second curve.

According to the printer of the third aspect, the second primer amount is determined based on the second curve.

A fourth aspect is the printer according to the third aspect, in which the first curve and the second curve have different shapes.

With the printer of the fourth aspect, it is possible to determine an appropriate amount of primer for each of the amount of the first ink and the amount of the second ink.

A fifth aspect is the printer according to the third or fourth aspect, in which the first curve has a steeper gradient in a region in which the amount of the first ink is smaller than a first intermediate value than in a region in which the amount of the first ink is greater than the first intermediate value.

With the printer of the fifth aspect, it is possible to set the first primer amount to increase in the region in which the amount of the first ink is greater than the first intermediate value.

A sixth aspect is the printer according to any one of the first to fifth aspects, in which the controller determines the amount of the primer in accordance with a sum of a value obtained by multiplying the first primer amount by a predetermined coefficient and a value obtained by multiplying the second primer amount by a predetermined coefficient.

With the printer of the sixth aspect, it is possible to adjust the amount of the primer by summing the value obtained by multiplying the first primer amount by a coefficient and the value obtained by multiplying the second primer amount by a coefficient.

A seventh aspect is the printer according to any one of the first to sixth aspects, in which when the sum of the first primer amount and the second primer amount exceeds a maximum amount of the primer that the primer ejector can apply to the unit region, the controller sets the amount of the primer that is applied to the unit region to the maximum amount.

An eighth aspect is the printer according to any one of the first to seventh aspects, in which the controller controls the amount of the first ink ejected by the first ink ejector to change a thickness of the first ink applied to a surface of the base material, and the controller controls the amount of the second ink ejected by the second ink ejector to change a dot area ratio of the second ink applied to the base material.

A ninth aspect is the printer according to any one of the first to eighth aspects further includes a third ink ejector that ejects third ink to the base material on a downstream side of the second ink ejector. The controller executes processing for controlling an amount of the third ink ejected to the unit region by the third ink ejector, and processing for determining the second primer amount in accordance with a sum of the amount of the second ink and the amount of the third ink.

According to the printer of the ninth aspect, the second primer amount is determined depending on the sum of the amount of the second ink and the amount of the third ink.

A tenth aspect is the printer according to any one of the first to ninth aspects, in which the first ink is white ink, and the second ink is non-white color ink.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings. Note that constituent elements described in the embodiment are merely examples, and the scope of the present invention is not intended to be limited thereto. To facilitate understanding of the drawings, the dimensions and number of each constituent element may be illustrated in an exaggerated or simplified form as necessary.

1. Embodiment

Figure 1:
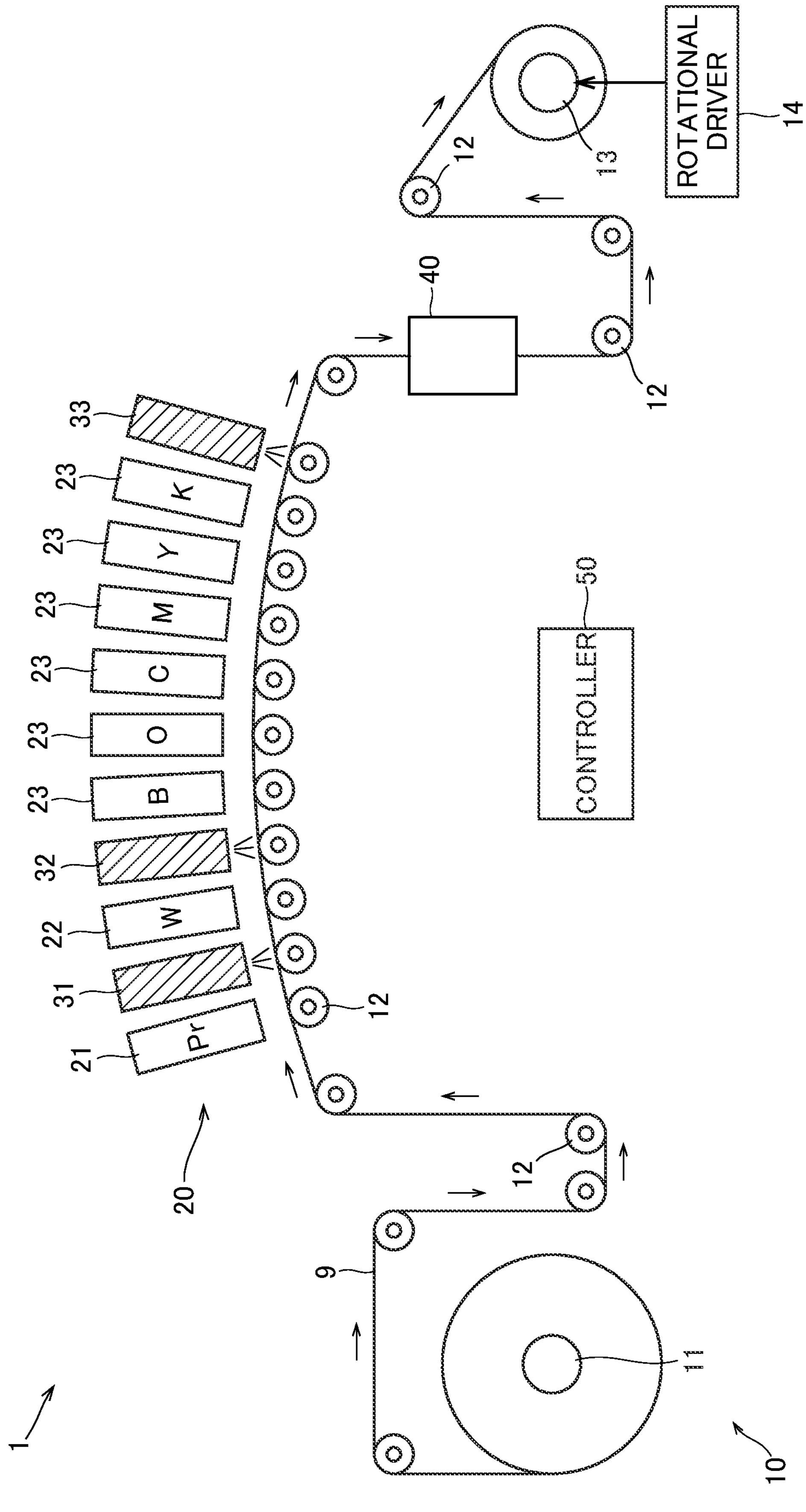
FIG. 1 is an illustration of a configuration of a printer according to an embodiment.

FIG. 1 is an illustration of a configuration of a printer 1 according to an embodiment. The printer 1 is an apparatus that prints an image on the surface of a long band-like continuous base material 9 by an inkjet method while transporting the continuous base material 9. The continuous base material 9 may, for example, be resinous film. Note that the continuous base material 9 may be a metallic base material (e.g., metal foil) or a glass base material. The continuous base material 9 may also be printing paper. The printer 1 includes a transport mechanism 10, a printing part 20, a curing part 40, and a controller 50.

The transport mechanism 10 is a mechanism for transporting the continuous base material 9 in a transport direction that extends in the longitudinal direction of the continuous material. The transport mechanism 10 includes an unwinder 11, a plurality of transport rollers 12, a take-up part 13, and a rotational driver 14. The continuous base material 9 is fed from the unwinder 11 and transported along a transport path configured by the transport rollers 12. Each transport roller 12 guides the continuous base material 9 downstream in the transport direction while rotating about a shaft that extends in a width direction perpendicular to the transport direction. The continuous base material 9 runs under tension over the transport rollers 12. The continuous base material 9 is collected by the take-up part 13. That is, the transport mechanism 10 transports the continuous base material 9 by a roll-to-roll method.

The take-up part 13 is connected to the rotational driver 14 such as a motor. When the rotational driver 14 rotates the take-up part 13, the continuous base material 9 fed out of the unwinder 11 is rolled up on the take-up part 13.

The printing part 20 is a processing part that ejects droplets of ink (hereinafter, referred to as "ink droplets") onto the continuous base material 9 transported by the transport mechanism 10). The printing part 20 includes a primer ejection head 21, a white-ink ejection head 22, and six color-ink ejection heads 23 in the order toward the downstream in the transport direction.

The primer ejection head 21, the white-ink ejection head 22, and the color-ink ejection heads 23 each have a plurality of nozzles (ejection ports) from which primer droplets or ink droplets are ejected. The nozzles are arranged in the lower surface of each ejection head that faces the continuous base material 9. The nozzles are arranged at intervals in the width direction.

The primer ejection head 21 ejects droplets of a primer (Pr). The primer is used to improve adhesion properties of the ink (the white ink and the color ink) for forming an image on the continuous base material 9. The primer has photo-curing properties (specifically, UV curability). The primer has tackiness higher than the adhesion strength of the ink for forming an image. The primer does not contain a coloring agent such as a pigment, but contains substances such as a photo-polymerizable monomer, a photo-initiator, and a binder resin. Preferably, the primer may be transparent.

The white-ink ejection head 22 ejects droplets of white (W) ink. The white ink is one of the ink for forming an image.

The six color-ink ejection heads 23 each eject different color ink. The color ink may preferably be ink of a color different from the white ink ejected from the white-ink ejection head 22. Specifically, the six color-ink ejection heads 23 eject ink droplets of blue (B), orange (O), cyan (C), magenta (M), yellow (Y), and black (K) in the order from the upstream side. That is, the color-ink ejection head 23 located on the most upstream side among the six color ink ejection heads 23 ejects droplets of blue ink. The color-ink ejection head 23 located on the most downstream side ejects droplets of black ink.

The printing part 20 further includes a first light irradiator 31, a second light irradiator 32, and a third light irradiator 33. The first light irradiator 31 is arranged between the primer ejection head 21 and the white-ink ejection head 22 in the transport path. The second light irradiator 32 is arranged between the white-ink ejection head 22 and the first color-ink ejection head 23 from the upstream side. The third light irradiator 33 is arranged downstream of the color-ink ejection head 23 located on the most downstream side.

The first to third light irradiators 31, 32, and 33 irradiate the continuous base material 9 with light (specifically, ultraviolet rays). The photo irradiation by the first light irradiator 31 precures the primer ejected to the continuous base material 9. The photo irradiation by the second light irradiator 32 precures the primer and the white ink that have been ejected to the continuous base material 9. The photo irradiation by the third light irradiator 33 precures the primer, the white ink, and the color ink that have been ejected to the continuous base material 9.

The curing part 40 is arranged downstream of the third light irradiator 33. The curing part 40 applies light so as to cure the primer and the ink for forming an image on the continuous base material 9.

Figure 2:
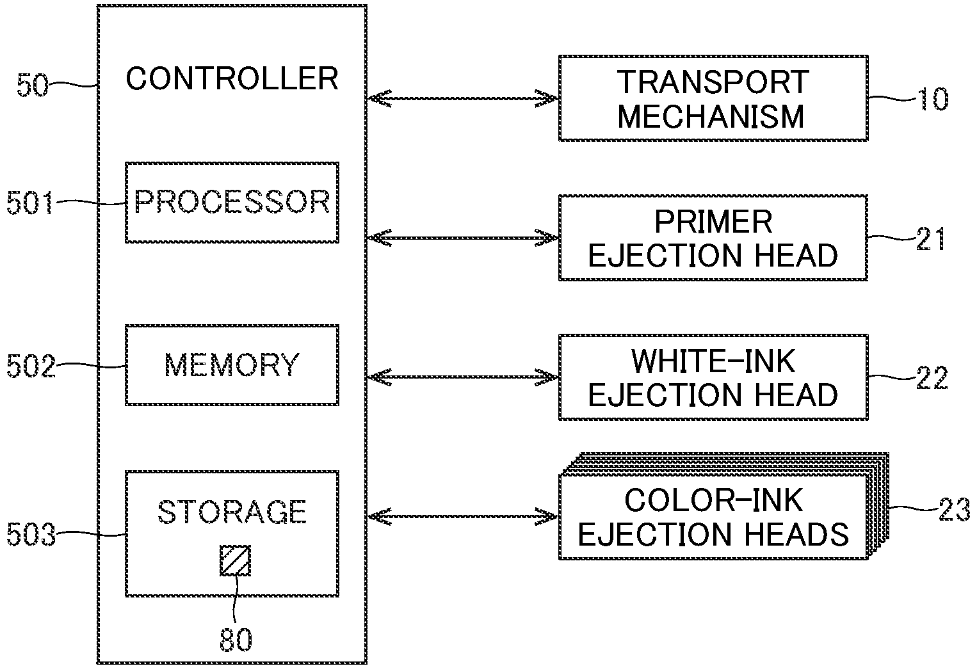
FIG. 2 is a block diagram illustrating electrical connection between a controller and each component of the printer.

The controller 50 is an information processor for controlling operations of each component of the printer 1. FIG. 2 is a block diagram illustrating electrical connection between the controller 50 and each component of the printer 1. The controller 50 is configured as a computer. Specifically, the controller 50 includes a processor 501 such as a CPU, a memory 502 such as a RAM, and a storage 503 such as a hard disk drive. The storage 503 stores a program 80 for performing print processing. The storage 503 also stores image data to be printed.

The controller 50 is electrically connected to the transport mechanism 10, the primer ejection head 21, the white-ink ejection head 22, and the six color-ink ejection heads 23. The controller 50 controls operations of these components in accordance with the program 80.

For example, the controller 50 may control the ejection of the primer from the primer ejection head 21, the ejection of the white ink from the white-ink ejection head 22, and the ejection of the color ink from each color-ink ejection head 23 on the basis of the image data to be printed and information that indicates the amount of transport transmitted from the transport mechanism 10.

Control of Primer Amount

The controller 50 controls the amount of the primer (hereinafter, simply referred to as the "primer amount") ejected from the primer ejection head 21 to each unit region of the continuous base material 9. Hereinafter, the method of determining the primer amount will be described.

Figure 3:
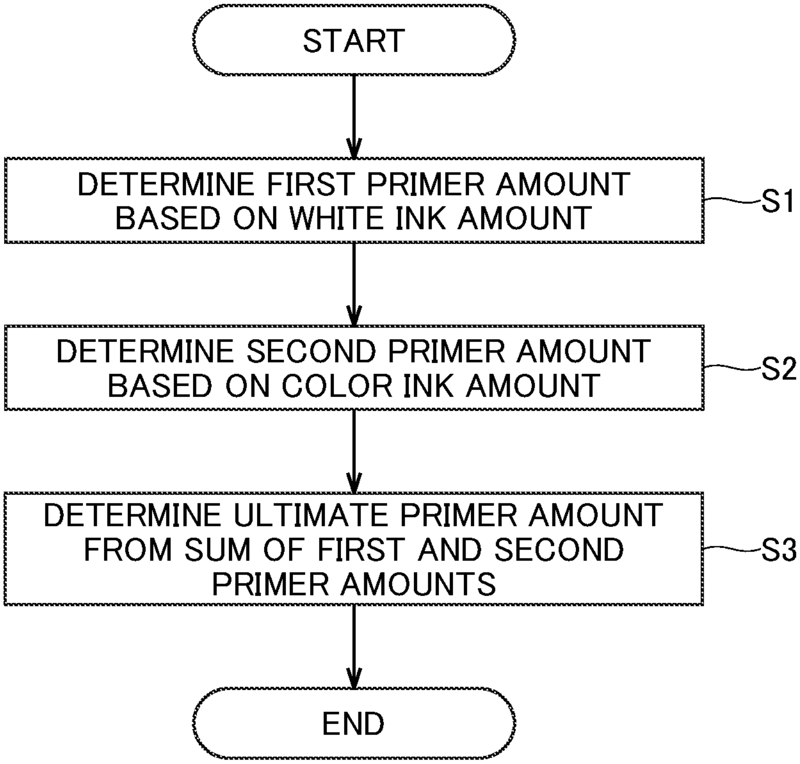
FIG. 3 is a flowchart for determining the amount of a primer.

FIG. 3 is a flowchart for determining the primer amount. As illustrated in FIG. 3, the controller 50 determines a necessary primer amount (hereinafter, referred to as a "first primer amount") on the basis of a white ink amount (step S1). The white ink amount as used herein refers to the amount of white ink ejected from the white-ink ejection head 22 to each unit region.

As illustrated in FIG. 3, the controller 50 also determines a necessary primer amount (hereinafter, referred to as the "second primer amount") on the basis of a color ink amount (step S2). The color ink amount as used herein refers to the sum of the amounts of color ink ejected from the six color-ink ejection heads 23 to each unit region.

After having determined the first primer amount and the second primer amount, as illustrated in FIG. 3, the controller 50 determines the ultimate primer amount by summing the first primer amount and the second primer amount (step S3).

Hereinafter, control of the white ink amount and control of the color ink amount are first described, and then the method of determining the first primer amount and the second primer amount will be described in the order specified.

Control of White Ink Amount

Figure 4:
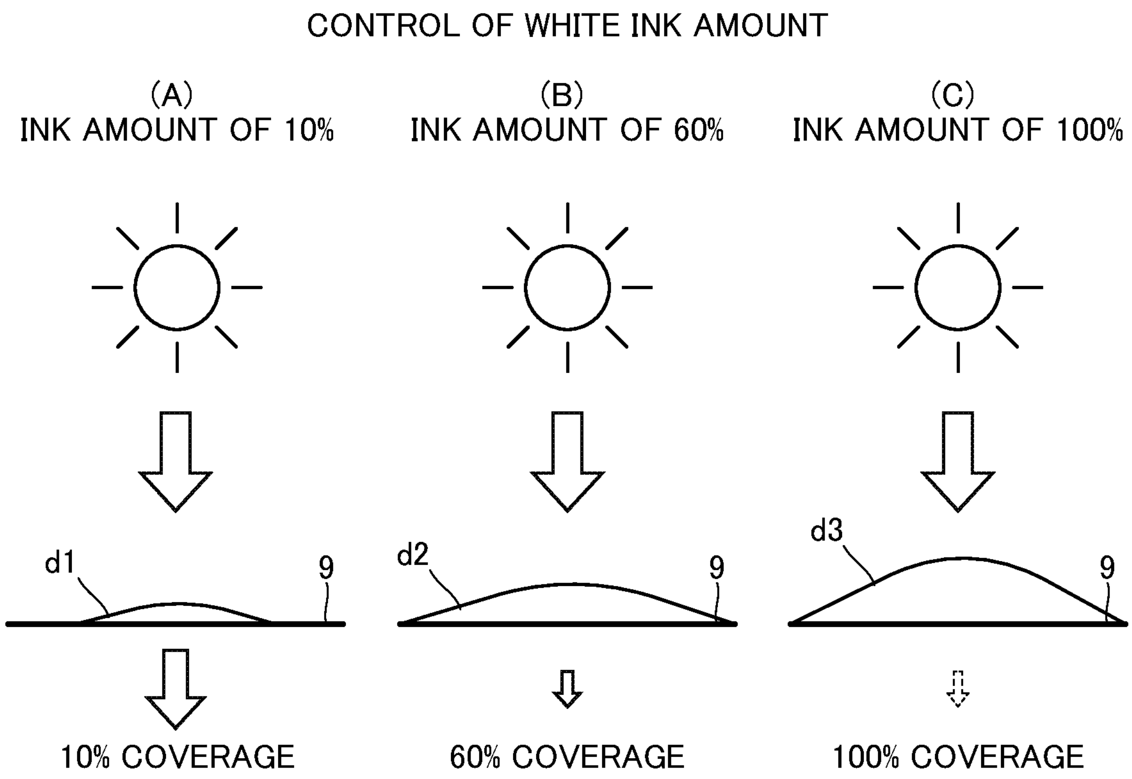
FIG. 4 is a conceptual illustration of controlling the amount of white ink.

FIGS. 4A to 4C are conceptual illustrations of controlling the amount of white ink ejected from the white-ink ejection head 22. The white ink is ejected in order to whitewash the ground of the continuous base material 9. The white-ink ejection head 22 ejects white ink on the basis of the amount of ink defined by the image data. The amount of ink given to the white-ink ejection head 22 is an amount that is set using, as a reference, a maximum value (100%) that the white-ink ejection head 22 can eject to each unit region of the continuous base material 9.

As the amount of white ink ejected from the white-ink ejection head 22 increases, the amount of ink adhering per unit region to the continuous base material 9 also increases. FIGS. 4A to 4C schematically illustrate enlarged white ink droplets landed on a unit region of the continuous base material 9.

FIG. 4A illustrates a condition in which a small amount (10%) of white ink is ejected from the white-ink ejection head 22 and landed on the continuous base material 9. A landed ink droplet d1 spreads over a certain area, but does not spread to such an extent that the unit region of the continuous base material 9 is covered completely.

FIG. 4B illustrates a condition in which a medium amount (60%) of white ink is ejected from the white-ink ejection head 22 and landed on the continuous base material 9. A landed ink droplet d2 spreads so as to apply a light coating on the entire unit region of the continuous base material 9.

FIG. 4C illustrates a condition in which a maximum amount (100%) of white ink is ejected from the white-ink ejection head 22 and landed on the continuous base material 9. A landed ink droplet d3 spreads so as to apply a thick coating on the entire unit region of the continuous base material 9.

The coverage of the continuous base material 9 with the white ink is defined by the ink coverage of the white ink landed on the continuous base material 9 and the thickness of the ink droplets of the white ink.

In FIG. 4A, the entire unit region of the continuous base material 9 is not covered with the ink droplet d1. In contrast, in the conditions illustrated in FIGS. 4B and 4C, the entire unit region of the continuous base material 9 is covered with the ink droplets d2 and d3. That is, in the condition illustrated in FIG. 4A, the ink coverage is lower than the ink coverage in FIGS. 4B and 4C. Thus, the condition illustrated in FIG. 4A exhibits lower coverage than the conditions illustrated in FIGS. 4B and 4C.

In the conditions illustrated in FIGS. 4B and 4C, the entire unit region of the continuous base material 9 is covered with the ink droplets d2 and d3. Thus, these conditions exhibit the same ink coverage, i.e., 100%. However, the condition illustrated in FIG. 4B exhibits a smaller thickness of the landed ink droplet d2 than the thickness of the landed ink droplet d3 in the condition illustrated in FIG. 4C. Thus, the condition illustrated in FIG. 4B exhibits lower coverage than the condition illustrated in FIG. 4C. That is, the coverage in the condition illustrated in FIG. 4B is 60% and allows the passage of part of incident light. In contrast, the coverage in the condition illustrated in FIG. 4C is 100% and almost disables the passage of incident light.

In this way, the coverage is not determined from only the ink coverage on the continuous base material 9 and is also affected by the thickness of the landed ink droplets.

Although the value of the amount of ink and the value of the coverage match in FIGS. 4A to 4C, these values are merely examples and the value of the amount of ink does not always necessarily have to match the value of the coverage.

Control of Color Ink Amount

Figure 5:
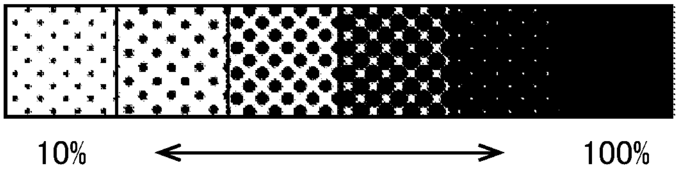
FIG. 5 is a conceptual illustration of controlling the amount of color ink.

FIG. 5 is a conceptual illustration of controlling the color ink amount. The color ink amount expresses the gradation of an image to be printed and is thus controlled in accordance with the dot area ratio indicated by the image data. That is, the color ink amount corresponds to the dot area ratio indicated by the image data. The controller 50 controls each color-ink ejection head 23 so that the color ink amount corresponding to the dot area ratio indicated by the image data is ejected.

In other words, in the case of the color ink, unlike in the case of the white ink, there is no concept that the coverage is controlled by the thickness of ink droplets landed on the continuous base material 9. In the case of the color ink, the concentration of each ink color is controlled by only the magnitude of the coverage of ink droplets (dot area ratio) that have landed and spread on the continuous base material 9. Accordingly, in the case of the color ink, the value of the concentration of each ink correlates almost linearly with the value of the ink coverage of the continuous base material 9 with the ink ejected from each color-ink ejection head 23.

Determination of Primer Amount

Figure 6:
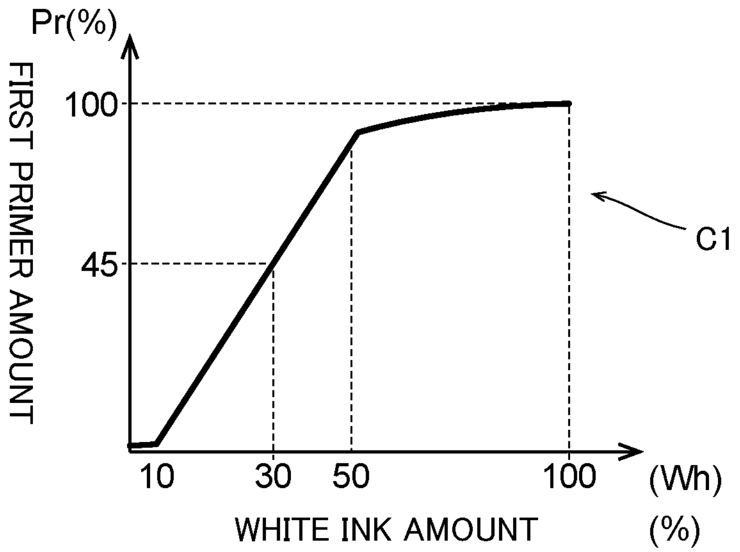
FIG. 6 is a diagram illustrating a first curve that defines correspondence between the amount of white ink and a first primer amount.
Figure 7:
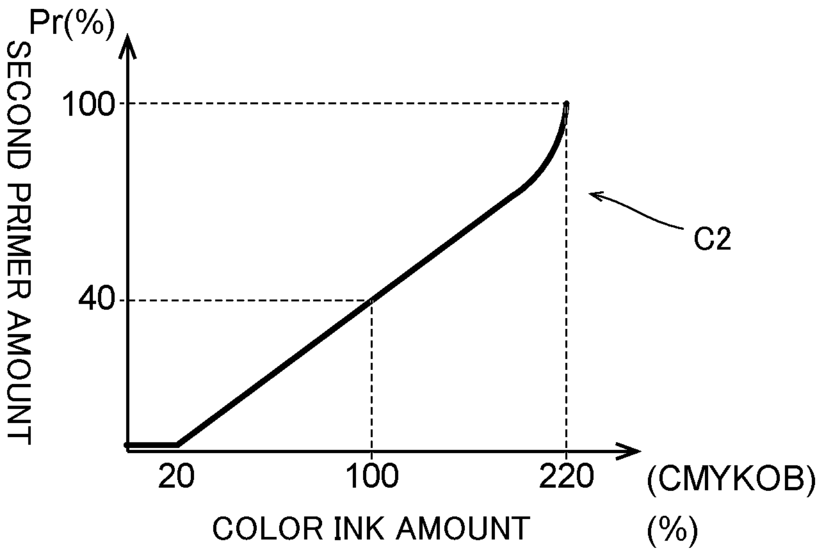
FIG. 7 is a diagram illustrating a second curve that defines correspondence between the amount of color ink and a second primer amount.

FIG. 6 is a diagram illustrating a first curve C1 that defines correspondence between the white ink amount and the first primer amount. The horizontal axis in FIG. 6 indicates the white ink amount, and 100% is the maximum value on the horizontal axis. FIG. 7 is a diagram illustrating a second curve C2 that defines correspondence between the color ink amount and the second primer amount. The horizontal axis in FIG. 7 indicates the sum of the amounts of six color ink materials including C, M, Y, K, O (orange), and B (blue), and 600% is the maximum value on the horizontal axis. Note that the amount of ink applied to each color-ink ejection head 23 is the amount that is set using, as the maximum value (100%), the amount that each color-ink ejection head 23 can eject to each unit region of the continuous base material 9.

The vertical axis in FIG. 6 indicates the first primer amount, and 100% is the maximum value on the vertical axis. The magnitude of the first primer amount of 100% is set in accordance with the following idea. That is, the white ink is applied overlaid on the primer. The first primer amount of 100% is basically set to the amount that enables, even if the white ink with the ink amount of 100% is applied overlaid on the primer, ensuring performance capabilities such as the adhesion properties of the color ink to the continuous base material 9.

It is, however, noted that the degree of the performance capabilities such as the adhesion properties of the white ink to the continuous base material varies depending on the combination of the continuous base material 9, the primer, and the color ink. Therefore, it is preferable that this point be also taken into consideration in the case of setting the first primer amount of 100%.

As described above, the white ink amount is set in consideration of also the thickness of ink droplets, in addition to the ink coverage. Accordingly, the first primer amount does not always become 100% when the white ink with the amount corresponding to the ink coverage of 100% is ejected to the continuous base material 9.

The vertical axis in FIG. 7 indicates the second primer amount, and 100% is the maximum value on the vertical axis. The magnitude of the second primer amount of 100% is set in accordance with the following idea. That is, the color ink is applied overlaid on the primer. The second primer amount is basically set to the amount that enables, even if the color ink with the ink coverage of 100% is applied and overlaid on the primer, ensuring performance capabilities such as adhesion properties of the color ink to the continuous base material 9.

It is, however, noted that performance capabilities such as adhesion properties of the color ink to the continuous base material 9 via the primer vary depending on the combination of the continuous base material 9, the primer, and the color ink. Therefore, it is desirable that this point be also taken into consideration. For example, in some cases, sufficient adhesion properties of the color ink to the continuous base material 9 may be attained with a relatively small amount of primer. In this case, the second primer amount may be associated with the color ink amount that corresponds to the ink coverage of less than 100%. On the contrary, in some other cases, for example, sufficient adhesion properties of the color ink to the continuous base material 9 may be attained only with a relatively large amount of primer. In this case, the second primer amount of 100% may be associated with the color ink amount that corresponds to the ink coverage of 100% or more.

It goes without saying that the first primer amount of 100% and the second primer amount of 100% may be increased or decreased depending on the required print quality.

The storage 503 stores information about the first curve C1 and the second curve C2. The controller 50 determines the first primer amount and the second primer amount on the basis of the first curve C1 and the second curve C2.

As illustrated in FIG. 6, the first curve C1 according to the present example defines the first primer amount for the white ink amount ranging from 0% to 100%. In the present example, when the white ink amount is in the range of 0% to 10%, the first primer amount is set to be low. When the white ink amount becomes 10% or more, the first primer amount is set to increase. Moreover, in the present example, the first curve C1 is set to have a steeper gradient (the increasing rate of the first primer amount) in a region in which the white ink amount is in the range of 10% to approximately 50% (first intermediate value) than in a region in which the white ink amount is in the range of approximately 50% to 100%. As described above, since the white ink amount corresponds to the coverage, even if the white ink amount is in the vicinity of the intermediate value (specifically, in the vicinity of approximately 50%), no gaps are formed between droplets of the white ink landed on the continuous base material 9. That is, the entire surface of the continuous base material 9 is almost covered with white ink droplets when approximately a half of the maximum amount of white ink is ejected from the white-ink ejection head 22. Thus, the first curve C1 is defined such that the first primer amount becomes approximately 100% in the region in which the white ink amount is approximately 50% or more.

As illustrated in FIG. 7, the second curve C2 according to the present example defines the second primer amount for the color ink amount (dot area ratio) ranging from 0% to 220%. According to the present example, in the region in which the color ink amount is in the range of 0% to 20%, the gradient of the second curve C2 (the increasing rate of the second primer amount) is set to zero or set to a value close to zero. Then, in the region in which the color ink amount is 20% or more, the gradient of the second curve C2 is set such that the second primer amount increases at almost a constant rate. Note that, in the case where the color ink amount exceeds 220%, the second primer amount is set to 100%. The color ink amount of 220% with which the primer amount becomes 100% is merely one example, and may be set arbitrarily as long as the color ink amount is within 600%.

The second curve C2 differs in shape from the first curve C1. Such different shapes of the first curve C1 and the second curve C2 allows an appropriate primer amount to be determined for each of the white ink amount and the color ink amount.

The first curve C1 and the second curve C2 illustrated in FIGS. 6 and 7 are merely one example, and the shapes or other features of them may be arbitrarily set. For example, the second curve C2 is set to increase the increasing rate (gradient) of the second primer amount in the region in which the color ink amount is approximately 220%. Alternatively, in this region, the second curve may be set to gradually decrease the increasing rate of the second primer amount.

In step S3 illustrated in FIG. 3, the controller 50 determines the ultimate primer amount from the sum of the first primer amount based on the first curve C1 and the second primer amount based on the second curve C2. Specifically, the controller 50 determines the primer amount from the following equation:

$$(\text{Primer Amount})=a\cdot P1+b\cdot P2 \quad (1)$$

where P1 is the first primer amount, P2 is the second primer amount. Also, a and b are coefficients that are approximately set depending on, for example, the type of the continuous base material 9. For example, in the case of the continuous base material 9 is an ordinary material, the coefficients a and b are set to "1." In the case where the continuous base material 9 is a material that is easily wetted with the spreading ink, the coefficient a or b may be set to a value larger than "1" in order to increase the primer amount.

For example, in the case where the white ink amount is 30% and the color ink amount is 100% for a given unit region of the continuous base material 9, the first primer amount and the second primer amount are determined respectively as 45% and 40% on the basis of the first curve C1 and the second curve C2. When these values are substituted into Equation (1), the primer amount becomes 85% (where the coefficients a and b are assumed to be "1"). Thus, the controller 50 causes the primer ejection head 21 to eject the primer such that the amount of the primer applied to the target unit region becomes 85%.

In the case where the primer amount calculated from Equation (1) exceeds 100%, the controller 50 sets the primer amount to 100% for this unit region. The primer amount of 100% is the maximum amount of the primer that the primer ejection head 21 can apply to each unit region. Note that this maximum amount may be a value smaller than a primer amount (critical primer amount) for the case where the primer ejection head 21 ejects the primer with a maximum amount of ejection (critical ejection amount). This allows the amount of the primer ejected from the primer ejection head 21 to be controlled within the range of 0% to 100% while allowing the primer ejection head 21 to have reserve capacity.

As described above, the printer 1 determines the first primer amount on the basis of the white ink amount, determines the second primer amount on the basis of the color ink amount, and determines the ultimate primer amount on the basis of the sum of the first primer amount and the second primer amount. This enables setting the primer amount to an appropriate value and accordingly enables ensuring sufficient adhesion properties of the color ink via the primer even if the color ink is ejected on the precured white ink.

According to the present embodiment, the printer 1 is configured to perform printing on the long band-like continuous base material 9 while transporting the continuous base material 9 by a roll-to-roll method. Alternatively, the printer 1 may be configured to perform printing on a base material that is transported sheet by sheet.

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

What is claimed is:

1. A printer comprising:

a transport mechanism that transports a base material downstream in a predetermined transport path;

a primer ejector that ejects a primer to the base material transported by the transport mechanism;

a first ink ejector that ejects first ink to the base material on a downstream side of the primer ejector;

a precuring part that precures the first ink applied to the base material on a downstream side of the first ink ejector;

a second ink ejector that ejects second ink to the base material on a downstream side of the precuring part; and a controller that controls an amount of the primer that is ejected to a unit region of the base material by the primer ejector, an amount of the first ink that is ejected to the unit region by the first ink ejector, and an amount of the second ink that is ejected to the unit region by the second ink ejector, wherein the controller is capable of executing:

processing for determining a first primer amount in accordance with the amount of the first ink;

processing for determining a second primer amount in accordance with the amount of the second ink; and processing for determining the amount of the primer in accordance with a sum of the first primer amount and the second primer amount.

2. The printer according to claim 1, further comprising:

a storage that stores a first curve that defines correspondence between the amount of the first ink and the first primer amount, wherein the controller determines the first primer amount in accordance with the first curve.

3. The printer according to claim 2, wherein the storage stores a second curve that defines correspondence between the amount of the second ink and the second primer amount, and the controller determines the second primer amount in accordance with the second curve.

4. The printer according to claim 3, wherein the first curve and the second curve have different shapes.

5. The printer according to claim 3, wherein the first curve has a steeper gradient in a region in which the amount of the first ink is smaller than a first intermediate value than in a region in which the amount of the first ink is greater than the first intermediate value.

6. The printer according to claim 1, wherein the controller determines the amount of the primer in accordance with a sum of a value obtained by multiplying the first primer amount by a predetermined coefficient and a value obtained by multiplying the second primer amount by a predetermined coefficient.

7. The printer according to claim 1, wherein when the sum of the first primer amount and the second primer amount exceeds a maximum amount of the primer that the primer ejector can apply to the unit region, the controller sets the amount of the primer that is applied to the unit region to the maximum amount.

8. The printer according to claim 1, wherein the controller controls the amount of the first ink ejected by the first ink ejector to change a thickness of the first ink applied to a surface of the base material, and the controller controls the amount of the second ink ejected by the second ink ejector to change a dot area ratio of the second ink applied to the base material.

9. The printer according to claim 1, further comprising:

a third ink ejector that ejects third ink to the base material on a downstream side of the second ink ejector, wherein the controller executes:

processing for controlling an amount of the third ink ejected to the unit region by the third ink ejector; and processing for determining the second primer amount in accordance with a sum of the amount of the second ink and the amount of the third ink.

10. The printer according to claim 1, wherein the first ink is white ink, and the second ink is non-white color ink.

* * * * *